3,428,295
PUSH-ACTUATED DRAIN VALVE
Martin W. Downey and Lloyd K. Jones, Morgantown, W. Va., assignors to Sterling Faucet Company, Morgantown, W. Va., a corporation of West Virginia
Continuation-in-part of application Ser. No. 361,501, Apr. 21, 1964. This application Aug. 15, 1966, Ser. No. 572,611
U.S. Cl. 251—263     11 Claims
Int. Cl. F16k 31/44; F16l 37/28, 29/00

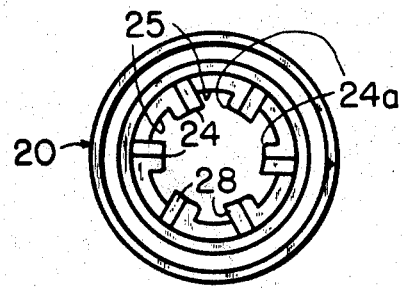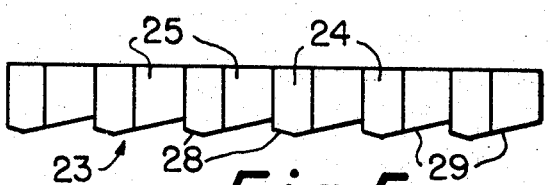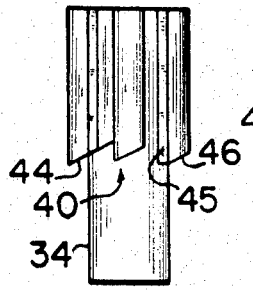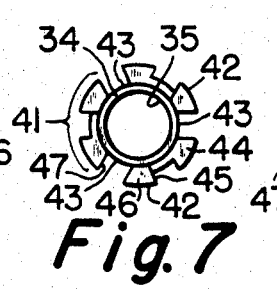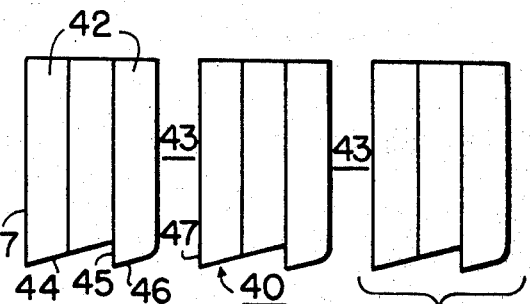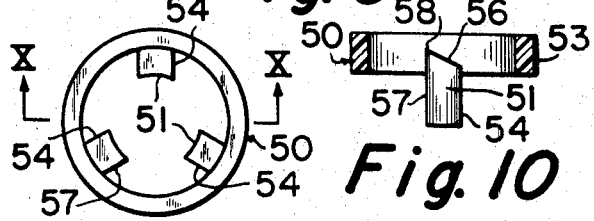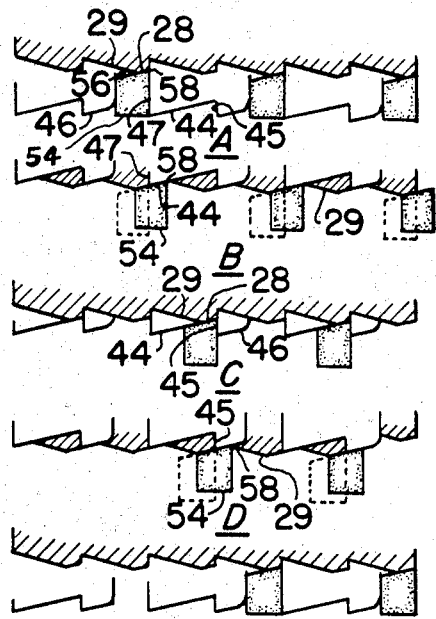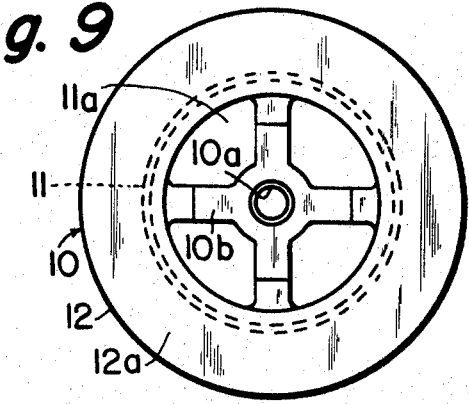
INVENTORS.
Martin W. Downey
Lloyd K. Jones
BY Green, McCallister & Miller
THEIR ATTORNEYS United States Patent Office 3,428,295
Patented Feb. 18, 1969

This application is a continuation-in-part of our co-pending application Ser. No. 361,501 filed Apr. 21, 1964, now U.S. Patent No. 3,333,815 and entitled, Push-Button Drain Valve.

The invention relates to the field of drain or waste valves, such as for bathtubs, basins, shower stalls, laundry tubs, etc., that may be opened and closed by simple, manual, sequential push-in and release operations. Such a valve, depending on the type of assembly with which it is used, may be operated by the hand or foot of the individual user. In the above-mentioned co-pending application, a valve of this general nature has been disclosed which has been highly satisfactory in its employment. The present disclosure deals with an improved drain valve construction or unit.

It has been determined that a drain valve employing a push-button part or element works highly efficiently, provided that the manual operating force is applied substantially centrally of the longitudinal or operating axis of the unit or to the center of the push button part, but that operating pressure applied to the outer edge or rim of the part has not been fully effective in closing and opening the drain. In a utilization such as a bathtub or a shower stall, it has been found advantageous to provide a valve that will operate by inward or backward, axial, down or depression force, applied either axially-centrally to the button part or at an angle or off-centered inclination to the rim or edge portion of the button part. The latter type of operation applies particularly when the valve is to be operated by the foot of the user. It has also been determined that it is advantageous to provide for maximum ease of push button movement, i.e., a minimized operating force consistent with a proper sealing of the drain when the valve is to be moved to its closed position.

It has thus been an object of the present invention to devise an improved form of push button actuated drain valve that has the advantageous features of earlier valve units, but that eliminates limiting or disadvantageous features thereof;

Another object of the invention has been to provide a valve unit that will be effectively operative in its opening and closing movements, irrespective of where the depressing or push-in force is applied directly in alignment or angularly to its button part or element, or irrespective of whether the manual operating force is applied parallel to the operating axis of the valve or applied in an angular relation with respect thereto;

A further object has been to devise an improved mounting, construction and operative employment of a resilient valve part or member;

A still further object of the invention has been to provide a practical and efficient push button operated drain valve that will have a positive opening and closing operation under various conditions of push-in movement, and that will have an improved operating action of its sealing or valve part during movement to a closed position.

These and other objects of the invention will appear to those skilled in the art in view of the illustrative embodiment and the claims.

In the drawings, FIGURE 1 is a vertical section in elevation through a valve device or unit embodying the principles of the invention, scaled to about twice the size of a commercial product, and showing the device in its closed position and in a typical mounting;

FIGURE 4 is a bottom plan view of a front sleeve-like housing part that constitutes a first, top or main operating part and, on the scale of FIGURES 1 to 3;

FIGURE 5 is an enlarged cam layout view representing the effective cam portions provided by the part of FIGURE 4;

FIGURE 6 is a vertical view on the scale of FIGURES 1 to 4 and showing a second, inner and main, sleeve-like operating part of the construction;

FIGURE 7 is a bottom plan view on the scale of FIGURE 6, also showing the secondary operating part;

FIGURE 8 is an enlarged cam layout view showing the effective cam portions provided by the part of FIGURES 6 and 7;

FIGURE 9 is a bottom plan view of a ring-like, third actuating element or part on the scale of FIGURES 1 to 4, 6 and 7;

FIGURE 10 is a vertical section in elevation on the scale of and taken along the line X—X of FIGURE 9;

FIGURE 11 is a top plan view on the scale of FIGURE 3 of an outer housing part or drain fitting of the valve unit;

And, FIGURE 12 is a series of abstract layout views A to E illustrating superimposed progressive interaction of cam surfaces provided by the parts or elements shown in FIGURES 3 to 10.

Figure 1:
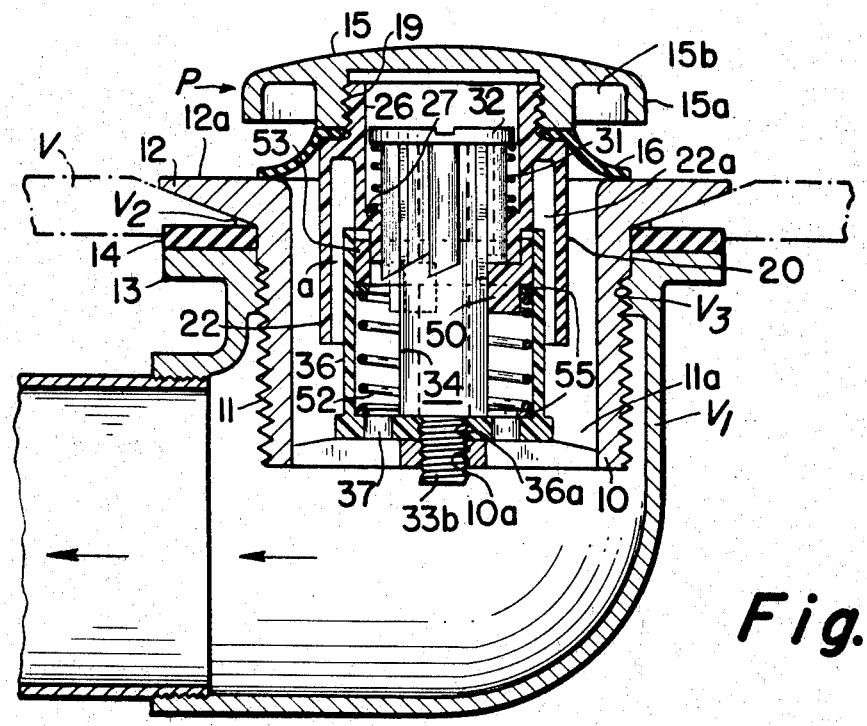

In FIGURE 1, a valve device or unit of the invention has been generally designated P. The unit P has an annular or cylindrical, outer, mounting housing part or fitting 10 (see also FIGURES 3 and 11) which is adapted to extend downwardly or backwardly through a drain opening provided by a drain pipe assembly. The housing fitting 10 is shown removably-secured in position within an upper thickened and threaded collar $V_3$ of drain pipe assembly $V_1$ through the agency of external threading 11 to extend longitudinally-axially, downwardly or backwardly within and along the assembly. A flat, resilient, annular positioning gasket 14 is adapted to be carried on a shelf or upper face of an annular flange 13 of the drain assembly $V_1$ to, on its upper face $V_2$, abut a lower peripheral face portion about the drain opening in a basin wall or the like which is to be drained. The mounting housing part or fitting 10, at its upper end, has a transversely, radially-outwardly, projecting mounting flange 12 whose underface is sloped to form a complementary face-to-face fit with a centrally-inwardly-sloped peripheral surface that surrounds the drain opening in basin wall V. It will thus be apparent, as shown in FIGURE 1, that the housing 10 forms an inner flow path within the drain opening defined by the basin wall V, along the upper portion of the drain pipe assembly $V_1$, and that upper planar face 12a of its mounting flange 12 forms a planar continuation of the basin wall V.

The upper or front end of the housing fitting 10 is fully open to define a drain passageway in the drain opening and its lower or back end is also open. As particularly shown in FIGURE 11, the back end of the housing 10 is provided with a reinforcing frame structure 10b of cruciform shape that defines a central supporting or mounting portion 10a that has a threaded bore to removably-receive a threaded stem portion 33b of a mounting bolt or stem 33. This enables operating parts of the valve unit to be removably-retained in an assembled operative relation within the housing part or fitting 10.

Figure 2:
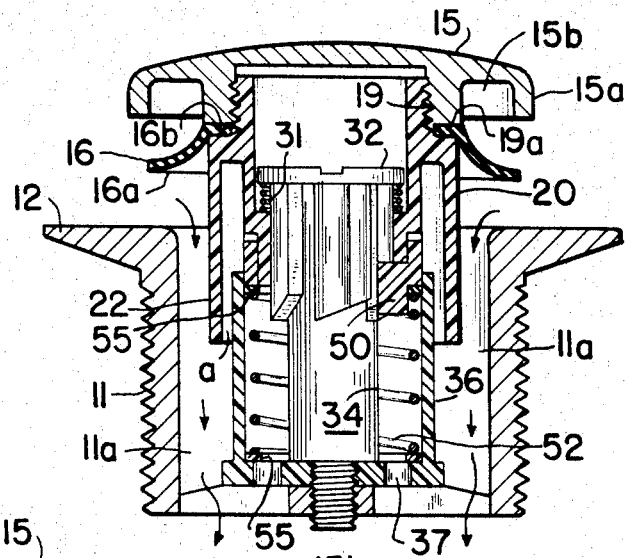
FIGURE 2 is a sectional view in elevation on the scale of and similar to FIGURE 1, except that it shows the valve unit per se and in its released open or drain-flow position.
Figure 3:
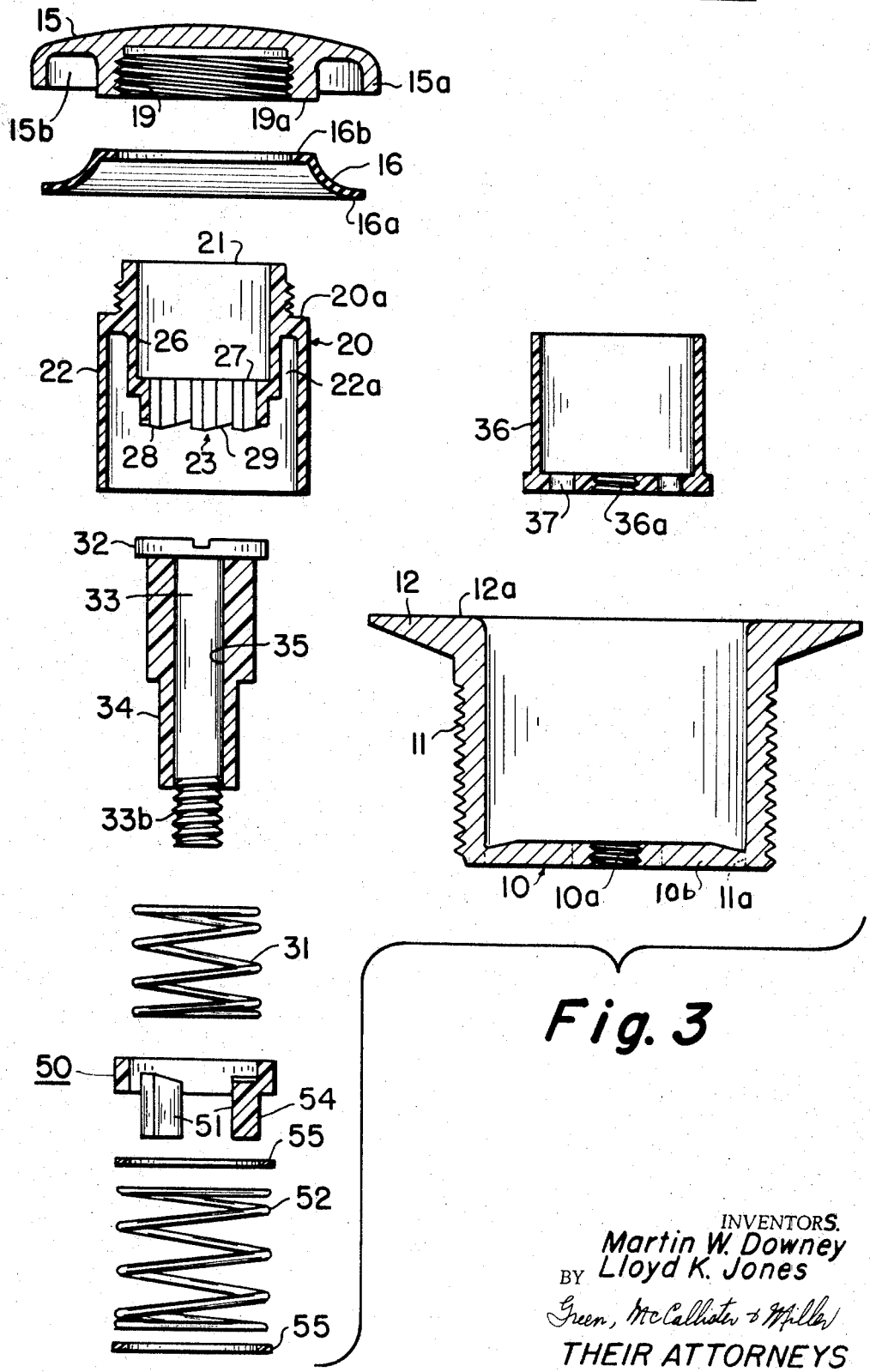
FIGURE 3 is an exploded view in elevation on the scale of FIGURES 1 and 2, showing parts of the valve unit or device in sequence in the relation of which they are assembled and disassembled.

A resilient annular gasket 16 of rubber-like material, such as synthetic resin in the nature of nylon, is shown operatively and removably-carried between a push button element, cap or means 15 and a slidable upper, front or main sleeve-like, housing and actuating part or element 20. As shown in FIGURES 1 to 3, the front or actuating housing part 20 has an outer, cylindrical, sleeve wall 22 that cooperates with a sleeve-like or cup-shaped, fixed-position, back or bottom housing part 36 to provide a two-part housing for the device P. The front housing part 20 and the back housing part 36 have, as shown, a slidable-mounted relation with respect to each other, and are normally-flexibly-retained in a longitudinally or axially-aligned relation by spring means. As shown particularly in FIGURES 1 to 3, the gasket 16 has an upper or front, inner securing flange or lip portion 16b of flat shape that defines a central opening therethrough, and has an outwardly-projecting and backwardly or downwardly curved annular skirt or flap body portion 16a for movement into and out of a closed or sealing-off position in which it resiliently-engages and closes-off fluid or liquid flow into an open-end drain passageway 11a defined between the housing fitting 10 and the pair of smaller diameter housing parts 20 and 36.

Figure 2A:
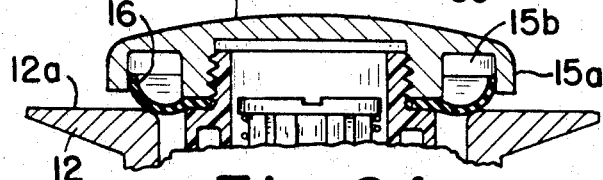
FIGURE 2A is a top sectional fragment in elevation of the unit of and on the scale of FIGURES 1 and 2, showing a full depressed position of push button means before it is released and showing the relief position of the valve part before it has been moved forwardly or outwardly to its seating position of FIGURE 1.

The flat lip portion 16b of the gasket 16 is shown positioned between an inner annular mounting ledge portion 19a of push button 15 and an annular ledge, flange or shelf portion 20a of the front housing part 20, on a front end portion of the housing part 20, and adapted to be removably-clamped between a planar bottom face of the ledge 19a and a planar front or top face of the ledge 20a. It will be noted that the ledge portion 19a has inner threads 19 that are adapted to cooperate with or screw-on external threads of a front sleeve portion 21 of reduced diameter of the housing part 20. The push cap or button means 15 has a relatively smooth outer or front face that slopes or declines downwardly or backwardly-outwardly towards its outer periphery, and that has a downwardly or backwardly-turned, outer edge flange 15a that defines an annular groove, offset recess or relief area with the ledge portion 19a to lighten the construction of the part 15 and, at the same time, provide a clearance or relief spacing for receiving a portion of the flap or skirt 16a of the valve 16 (see FIGURE 2A) when the push button 15 is substantially fully pressed inwardly to operate the valve unit and before the valve unit is released and has moved either slightly outwardly to the sealed-off or closed position of FIGURE 1 or fully outwardly to the fully open position of FIGURE 2.

As illustrated particularly in FIGURE 3, mounting stem, post or bolt 33 has a screw-driven slotted head 32 and is adapted to receive the secondary actuating or cam part 34 of hollow, plug-like shape thereon (see also FIGURES 2, 3 and 6). The secondary actuating part 34 may be slid off the lower end of the stem of the mounting bolt 33 when the bolt has been screwed out of a mounted position within the threaded bore of the central mount 10a of the stationary main housing part or fitting 10 as well as out of a central, threaded bore 36a of the back housing part 36. It will be noted that the head 32 of the bolt 33 is positioned for "up" and "down" or "front" and "back" axial sliding movement within an inner sleeve wall 26 of the first actuating part or front housing 20 (see particularly FIGURES 1 and 2). A spiral expansion spring 31 is adapted to fit about an upper or front portion of the plug or secondary actuating part 34 and to, at its lower or back end, abut inner shelf portion 27 of the housing part 20 and, at its upper end, abut against the underside of the head 32 of the mounting bolt 33. The flexible spring 31 thus normally urges the bolt 33 and the secondary actuating part 34 upwardly or frontwardly within the inner sleeve wall 26 of the front housing or primary actuating part 20.

A ring-like or annular, tertiary and intermediately-positioned actuating part 50 is adapted to slidably-fit within the back housing part 36 and on a back or reduced diameter portion 34 of the second, plug-like, actuating part 34. Expansion spring 52 is adapted to flexibly-engage a flat annular wear ring 53 and thus indirectly, the bottom or back edge face of the tertiary actuating part 50 and to extend within the back or lower housing part 36 to urge the tertiary actuating part 50 and the primary part 20 upwardly or forwardly and retain them in an operating relation. The spring 52 thus normally urges the front housing part 20 backwardly or outwardly with respect to the bottom or lower housing part 36.

It will be noted, as shown particularly in FIGURES 1 and 3, that the back housing part 36 has a threaded bore 36a centrally positioned in its lower or closed end for receiving and passing the threaded end portion 33b of the mounting stem or bolt 33. The back housing part 36 also has a part of drain holes 37 through its bottom wall that discharge any fluid or liquid that may enter the valve mechanism during its operation and particularly, during the flow of drain water.

The drain water, when the valve is in its open position shown in FIGURE 2, flows in the direction of the arrows along annular passageway 11a defined between the inner wall of the mounting housing fitting 10 and outer portions of the walls of the cooperating inner housing parts 20 and 36 to pass out through the spacing at the bottom or back end of the device between the rib structure 10b of the housing 10 into the drain pipe assembly $V_1$.

The outer wall, sleeve or skirt 22 of the primary actuating or front housing part 20 has an outwardly-spaced, radial clearance-defining relation with the sleeve wall of the back housing part 36, as indicated by a of FIGURE 1. This enables the push button means or cap 15 to be pivotally operated by an off-centered longitudinal-axial push-in or depressing movement and, at the same time, effectively accomplish a proper camming action of the operating parts so as to open and close the valve. This type of operation is further facilitated by the construction and mounting of the gasket 16 and of the push button means or cap 15. The actuating parts 20, 34 and 50 and the housing parts 20 and 36 are shown of resin construction, of a suitable material such as nylon in a relatively hardened form; they give flexibility to the construction and an automatic lubrication of movement between the parts. It will be noted that the flexible spring 31 normally retains the front and back housing parts 20 and 36 in axial or longitudinal alignment with respect to each other, but permits an off-centered application of push-in actuation or depression of the cap 15.

The primary actuating or front housing part 20 which may be termed a control means, has an axially-extending, combined guide groove and spline or upset cam portion 23 along the inside of an inner wall portion of the reduced sleeve wall 21. The developed surface of the cam portion is shown in FIGURE 5 and has an internal facing contour which includes a plurality of equiaxially-spaced, inwardly-projecting splines or axially-elongated teeth portions 24 and alternate grooves or recesses 25 (see FIGURES 3 to 5). The teeth 24 are rounded or provided with a small radius 24a (see FIGURE 4) along their counterclockwise inner edges. The spline or teeth portions 24 are separated by the dovetail-shaped, longitudinally-extending groove portions 25. In its assembled position, the primary actuating part or control means 20 is, at all times, urged downwardly, inwardly or backwardly by the upper spring 31 that is positioned within the hollow bore of the upper, reduced diameter, sleeve wall 26 thereof. As previously noted, the spring 31 engages an upper ledge or abutment portion 20a of the actuating part 20 and an underside of the flanged head 32 of the anchor or mounting bolt 33. It will be noted that the mounting bolt 33 passes through a central bore 35 in the secondary or plug-like actuating part 34 to threadably-engaging both the threaded bore portion 36a of the cup-like back housing part 36 and the threaded bore of the mounting portion 10a of the main housing part or fitting 10.

With reference particularly to FIGURES 6 and 7, the plug or secondary actuating part 34 has an elongated cam 40 along its enlarged upper or front end portion that is shown in its developed form in FIGURE 8. As shown particularly in FIGURE 7, the cam 40 has a plurality of radially-outwardly projecting and longitudinally-axially extending portions 41, each of which has a pair of longitudinally-extending tooth-like ribs or splines 42 that are located equiangularly about the central axis and are shaped to cooperatively-interfit with groove portions 25 of the cam 23 of the primary part 20. The portions 41 are separated, as shown by three, equally-peripherally-spaced slots or release groove portions 43.

The third actuating part 50 which may be termed an indexing annulus, key member or ring element is mounted on the smaller cylindrical diameter portion of the part 34 for longitudinal-axial and circumferential-turning movement thereon. The lower spring 52 which has a force factor significantly greater than that of the upper spring 31, operatively-engages the part 50 to normally urge or hold it in cooperative engagement with the upset cam 23 and the locating cam 40. As previously mentioned, wear-resisting washer or bearing ring 55 may be interposed between the upper end of the spring 52 and the lower edge of the indexing ring element 50.

Keeper key portions 54 of the tertiary part 50 (see particularly FIGURES 3, 9 and 10) are shaped and spaced to cooperatively-interfit between the splines 42 of the cam 40 of the secondary part 34 and to align with the spline portions 24 of the upset cam 23 of the primary part 20. The tertiary part 50 and the spring 52 are operatively-housed within the upwardly-open end of the inner housing part 36, which, as shown in FIGURES 1 and 2, is slidably-overlapped by the outer wall or sleeve portion 22 of the primary actuating or front housing part 20.

With reference particularly to FIGURES 7 and 8, it will be seen that the cam 40 which may also be termed a locking or position-retention cam, has inclined transfer or guiding surface portions 44 that are inclined backwardly or downwardly-clockwise, as viewed from the bottom of the part 34. The transfer surface portions 44 terminate at their clockwise edges in holding shoulders or abrupt, circumferentially-spaced, radially-outwardly-extending, side walls 45 that are formed by an adjacent spline 46.

Keeper lugs or portions 54 of the part 50 have upwardly or forwardly-facing, inclined, transfer surfaces 56 (see FIGURE 12A) that cooperatively-engage transfer surfaces 44 and 46 of the locating cam 40 of the part 34. The keeper lugs 54 have laterally or circumferentially-clockwise-facing, abrupt shoulder portions 57 (see FIGURE 9) that cooperate with holding shoulders 45 and secondary shoulders 47 of the locating cam 40. Inclined transfer surfaces 56 and the shoulders 57 intersect and form a forward toe or wedge portion 58 that cooperates with the upset cam as herein described.

It will be seen that the projecting portions 41 of the locating cam 40 define two stable longitudinal positions for the key annulus or part 50 thereon. One stable position results when the shoulders 57 of the keeper lugs 54 are in engagement with holding shoulders 45 and the inclined transfer surfaces 56 engage transfer surfaces 44. The other stable position results when shoulders 57 are in contact with secondary shoulders 47 of the cam 40 and the keeper lugs 54 are free to move longitudinally in the slot portions 43.

The upset cam 23 of FIGURE 5 has a plurality of angularly-spaced and downwardly-inclined-facing facets or lifting surfaces 28 that are formed (as shown in FIGURES 3, 4 and 5) on spline portions 24 adjacent the clockwise edges thereof. Lifting surfaces 28 are formed on oppositely-inclined return wedge surfaces 29 that are engaged by toes 58 (see FIGURE 12A) of the keeper lugs 54 to transmit force from the spring 52 to the primary or first actuating part 20. Since the spline portions 24 of the part 20 interfit with the splines 42 of the locating cam 40, lifting surfaces 28 will always be in longitudinal alignment with portions of the locating cam 40 adjacent to holding shoulders 45 and 47 and thus, adjacent to stable positions established thereby.

The operation of the cam mechanism is illustrated somewhat diagrammatically in parts A to E of FIGURE 12. This figure shows the progressive movement of the keeper lugs 54, as induced by relative movement of the cam 23 and locating cam 40. In FIGURE 12A, the keeper parts or lugs 54 are shown in one of their stable positions within slots 43. As a consequence, the inclined transfer surfaces 56 are in engagement with lifting surfaces 28 to hold upset cam 23 and valve member 16 that is attached thereto in an "up" or "open" flow-permitting position.

When it is desired to close-off flow through the drain opening of the basin V, the push button or cap 15 is moved downwardly, inwardly or backwardly to close adjacency to the face 12a of the flange 12 (see FIGURE 2A) and released. The downward axial-longitudinal movement actuates or moves upset cam 23 and keeper lugs or parts 54 downwardly to the dotted position shown in FIGURE 12B. When the lugs 54 clear the shoulders 47, the upward force exerted by the spring 52 causes the parts 54 to slide along transfer surface 44 and rotate around the secondary actuating part 34 to the solid line position of FIGURE 12B. Release of the inward or downward manual pushing-in action on the button or cam 15 permits toes 58 of the keeper lugs or parts 54 to wedge against return surface 29 of upset cam 23 and force the latter cam upwardly to the position shown in FIGURE 12C.

The keeper lugs or parts 54 come to rest in their other stable position against shoulder 45 on the locating cam 40. In this position, the resilient valve part 16 is held closed by upper spring 31 (see FIGURE 1). When it is desired to initiate liquid or fluid flow out of the drain opening, push button means or cap 15 is again depressed downwardly to move keeper lugs or parts 54 forwardly or downwardly to the dotted position of FIGURE 12D, at which time, they clear holding shoulder 45. The expanding force of lower spring 52 causes the keeper parts 54 to rotate and slide along transfer surface 46 to bring toes 58 into wedging engagement with return wedging surface 29. When the push button or cap 15 is released, the spring 52 urges the keeper parts 54 and upset cam 23 backwardly or upwardly against the force exerted by the upper spring 31, whereby the keeper parts rise into the release groove and return to the position of FIGURE 12E (compare FIGURE 12A).

While a preferred embodiment of the invention has been shown for the purpose of illustration, it will be understood that various changes and modifications may be made by those skilled in the art without departing from the spirit and scope thereof.

We claim:
1. In a push-actuated drain valve device for opening and closing-off fluid flow through an open drain portion, a housing fitting for removably-mounting in the open drain portion, said fitting having an open inlet portion for receiving the fluid to be drained and having an open outlet portion to deliver the drained fluid, an annular seating flange extending transversely from said inlet end portion and defining a valve seating surface about the opening to said inlet end portion, a centrally-positioned mount carried by said outlet end portion, a cooperating pair of sleeve-like front and back housing parts for relative longitudinal sliding movement with respect to each other within said fitting, means cooperating with said back housing part for removably-securing said housing parts on said mount in a radially-spaced relation within and along said fitting to define a drain passageway therewith that extends from said seating flange, said front housing part having a front end portion projecting longitudinally-outwardly beyond said seating flange, push button means removably-mounted on said front end portion, a resilient valve removably-positioned between said front end portion and the underside of said push button means and having a flap body projecting transversely-outwardly for movement into and out of seating engagement with said seating flange to open and close-off fluid flow through said passageway, and said push button means having an annular offset portion on its underside defining a relief area for said flap body when said push button is fully depressed with respect to said seating flange.

2. A drain valve device as defined in claim 1 wherein said relief area is defined about the outer periphery of said push button means by a backwardly-extending flange whose inner diameter substantially corresponds to the normal radial-outward extent of said flap body.

3. In a push-actuated drain valve device for opening and closing-off fluid flow through an open drain portion, a housing fitting for mounting in the open drain portion, said fitting having an open inlet end portion for receiving the fluid to be drained and having an open outlet end portion to deliver the drained fluid, an annular seating flange extending transversely from said inlet end portion and defining a valve seating surface about the opening to said inlet end portion, a centrally-positioned mount carried by said outlet end portion, a cooperating pair of sleeve-like front and back housing parts for relative longitudinal sliding movement with respect to each other within said fitting, means cooperating with said back housing part for removably-securing said housing parts on said mount in a radially-spaced relation within and along said fitting to define a drain passageway therewith that extends from said seating flange, said front housing part having a front end portion projecting longitudinally-outwardly beyond said seating flange, an annular valve mounting ledge about said front end portion, push button means removably-mounted on said front end portion longitudinally-outwardly of said mounting ledge, a resilient valve having an inner peripheral portion positioned on said front end portion by said mounting ledge and defining an open center to pass on and off said front end portion, said valve being removable from said front end portion for replacement when said push button means is removed from said front end portion, said valve having a flap body projecting transversely-outwardly for movement into and out of seating engagement with said seating flange, and control means operatively-positioned within said pair of housing parts and constructed on sequential depression and release of said push button means with respect to said seating flange to move said valve into and out of seating engagement with said flange.

4. A drain valve device as defined in claim 3 wherein said push button means has an annular ledge portion in longitudinal alignment with said mounting ledge for positioning said inner peripheral portion of said valve therebetween when said push button is mounted on said front end portion.

5. A drain valve device as defined in claim 3 wherein said push button means has an annular groove portion on its underside of a transverse width substantially corresponding to the radial-outward extent of the flap body of said valve to define a relief area for said flap body when said push button means is fully depressed with respect to said seating flange.

6. A drain valve device as defined in claim 5 wherein said control means has cooperating cam portions that move said valve means to a valve seating position after said push button means is released from its fully depressed position, whereby said flap body moves out of said relief area into a valve seating position.

7. A drain valve as defined in claim 3 wherein, said front housing part is adapted to move along said back housing part when said push button means is depressed and released, said front and back housing parts having flexible means normally retaining them in longitudinal-axial alignment with respect to each other, and said front housing part defines a radial clearance space with respect to said back housing part, whereby said push button means may be depressed and released by an off-centered force applied thereto.

8. A drain valve device as defined in claim 3 wherein, said front and back housing parts are constructed for longitudinal sliding movement with respect to each other on depression and release of said push button means, said control means and said pair of housing parts have cooperating portions to provide for and assure movement of said valve means into and out of seating engagement with said flange, both when an axially-centered push-in force is applied to said push button means and when an inclined off-centered force is applied thereto, and said control means has cooperating portions for retaining said valve in a seating position upon a depression and release of said push button means and for retaining said valve in an unseated position upon a sequential depression and release of said push button means.

9. A drain valve device as defined in claim 3 wherein, said flap body of said valve is sloped backwardly from said ledge and transversely-outwardly beyond said drain passageway and along said seating flange, and said push button means has an offset under portion defining a relief area for said flap body when said valve is moved into a fully depressed position with respect to said seating flange.

10. A drain valve as defined in claim 9 wherein, said offset under portion is defined by an inner annular mounting ledge portion of said push button means and an outer annularly backwardly-projecting flange, and said valve has a mounting lip portion positioned between said inner annular mounting ledge portion of said push button means and said annular valve mounting ledge of the front end portion of said front housing part.

11. A drain valve device as defined in claim 10 wherein, said front end portion of said front housing part is externally-threaded, said inner annular mounting flange portion is internally-threaded to screw on and off said externally-threaded front end portion, and said mounting lip is clamped in position therebetween when said push button means is secured on said front end portion.

References Cited
UNITED STATES PATENTS

| | | | |
|---|---|---|---|
| 3,099,019 | 7/1963 | Tiller | 4—200 |
| 3,173,646 | 3/1965 | Wilcox | 251—138 |
| 3,263,243 | 8/1966 | Doyle | 4—203 |

M. CARY NELSON, *Primary Examiner.*

WILLIAM R. CLINE, *Assistant Examiner.*

U.S. Cl. X.R.

251—144